United States Patent [19]
Tomita et al.

[11] Patent Number: 4,749,344
[45] Date of Patent: Jun. 7, 1988

[54] OIL FEEDING DEVICE FOR SCROLL FLUID APPARATUS

[75] Inventors: Yoshikatsu Tomita, Shizuoka; Katsuaki Kikuchi; Eiichi Hazaki, both of Tsuchiura; Tetsuya Arata, Shimizu; Masao Shiibayashi, Shimizu; Kazutaka Suefuji, Shimizu; Takao Senshu, Shizuoka; Akira Murayama, Shimizu, all of Japan

[73] Assignee: Hitachi, Ltd., Tokyo, Japan

[21] Appl. No.: 42,700

[22] Filed: Apr. 27, 1987

[30] Foreign Application Priority Data

Jul. 21, 1986 [JP] Japan ............................ 61-169741

[51] Int. Cl.$^4$ .................... F01C 1/02; F01C 21/04; F01M 11/02; F16C 9/02
[52] U.S. Cl. ......................... 418/55; 418/88; 418/94; 184/6.18; 384/99
[58] Field of Search ............... 418/55, 88, 94; 184/6.16, 6.18; 384/99

[56] References Cited

U.S. PATENT DOCUMENTS 4,462,772 7/1984 Hazaki et al. ............... 418/55
4,502,852 3/1985 Hazaki ........................ 418/94
4,623,306 11/1986 Nakamura et al. .......... 418/94

FOREIGN PATENT DOCUMENTS 2062219 6/1972 Fed. Rep. of Germany ........ 418/94
60-228793 11/1985 Japan ................................ 418/94

Primary Examiner—John J. Vrablik
Attorney, Agent, or Firm—Antonelli, Terry & Wands

[57] ABSTRACT

An oil feeding device for a scroll fluid apparatus. A fixed scroll member is associated with an orbiting scroll member. A crankshaft rotatably supported by a bearing of a frame has a crank portion engaging with a plain bearing of the orbiting scroll member. A variable speed driving motor is connected to the crankshaft. An oil feeding passageway is provided in the crankshaft and the crank portion. Oil is supplied to the plain bearing of the orbiting scroll member through a space at the end face of the crank portion. An oil flow passage is provided in parallel with the axis and in a surface of the crank portion located at a position advanced through approximately 45 degrees toward the rotational direction of the crank portion, from a position at which the load acting radially of the shaft due to the centrifugal force caused by the orbiting motion of the orbiting scroll member is applied to the crank portion of the shaft.

4 Claims, 4 Drawing Sheets

OIL FEEDING DEVICE FOR SCROLL FLUID APPARATUS

BACKGROUND OF THE INVENTION

The present invention relates to an oil feeding device for a scroll fluid apparatus suitable for use as compressors, expanders, liquid pumps, etc. and operated at variable rotational speeds using an inverter and, more particularly, to an oil feeding device which provides a stable lubrication to the bearings during the operation at variable rotational speeds.

PRIOR ART

A scroll fluid apparatus usually comprises: an orbiting scroll member including an end plate, and a wrap in the form of an involute or any other curve similar thereto which is located on the end plate in upstanding position; a fixed scroll member including an end plate, a wrap in the form of an involute or any other curve similar thereto which is located on the end plate in upstanding position, and a discharge port formed in the end plate; a housing formed with a suction port and containing the orbiting scroll member and the fixed scroll member maintained in pressing engagement with each other at the surface of the respective end plates with the wraps facing inwardly against the end plates of the opposed scroll members; an Oldham's ring interposed between the orbiting scroll member and the housing or the fixed scroll member for preventing the rotation of the orbiting scroll member on its own axis; and a crankshaft maintained in engagement with the orbiting scroll member to enable the orbiting scroll member to move in orbiting movement by the action of the crankshaft while the orbiting scroll member does not rotate apparently on its own axis, whereby the fluid within sealed spaces defined by the two scroll members can be allowed to perform a pumping action or a pressure fluid can be supplied through the discharge port to expand the pressure fluid to cause a drive force for rotating the crankshaft to be generated.

In scroll fluid apparatus of the aforementioned type, the crankshaft is usually of a vertical type and its shaft portion is journaled by two plain bearings or upper and lower plain bearings while its crank portion is in engagement with a plain bearing mounted on the orbiting scroll member. A gap is provided between the crankshaft and each of the opposing plain bearings, so that the crankshaft can be moved slightly in the radial direction within the gaps. In such a scroll fluid apparatus, a radial force, which is understood to be a fluid pressure within the sealed spaces defined by the two scroll members and a centrifugal force caused by the orbiting scroll member, acts on the crank portion of the crankshaft in the radial direction thereof through the orbiting scroll member. This makes the crankshaft tilt between the upper plain bearing and the lower plain bearing and causes it to be pressed strongly thereagainst.

Oil feeding devices for such a scroll fluid apparatus are disclosed, for example, in the specification of U.S. Pat. No. 4462772. In the oil feeding device described above, a bearing load generated by the fluid pressure which acts on the orbiting scroll member during the compression stroke of the scroll compressor can be coped with effectively. In a compressor controlled at variable rotational speeds employing an inverter, however, any load applied on the bearing of the orbiting scroll member of the centrifugal force caused by the substantial extent the centrifugal force caused by the orbiting scroll member, and this fact has not been mentioned in the above described oil feeding device. The maximum possible rotational speed of a compressor has been increased year-by-year in this technical field, and the effect of loads caused by centrifugal forces in such high speed operations has accordingly become critical.

More specifically, a load applied on the bearing of the orbiting scroll member can be understood as the load generated by the gas pressure which acts on the orbiting scroll member as a result of the compression action of the compressor and the load generated by the centrifugal force; in magnitude the load caused by the centrifugal force is larger than the gas pressure load. However, the above described oil feeding device does not take this centrifugal force into consideration, and has suffered from problem in terms of the reliability of the bearing of the orbiting scroll member during a high speed operation when applied to a scroll compressor operated at variable rotational speeds.

SUMMARY OF THE INVENTION

Accordingly, an object of the present invention is to provide an oil feeding device which ensures the provision of stable lubrication to the bearing of the orbiting scroll member of a scroll fluid apparatus controlled at variable rotational speeds so as to form an oil film of sufficient thickness thereon.

The above described object can be achieved by providing an oil feeding passage recessed on the surface of the crank portion in the axial direction thereof at a position which is advanced for an extent of 45 degrees in the direction of rotation of the crank portion with respect to a line of action of a load which is applied on the crank portion in the radial direction of the crankshaft by the centrifugal force.

When a scroll compressor is operated at variable rotational speeds by an electric motor provided with an inverter, the area on the sliding surface of the crank portion engaging with the bearing of the orbiting scroll member at which the oil film of minimum thickness is formed moves between a line of action of the fluid pressure and a line of action of the centrifugal force. This position moves toward the latter line as the rotational speed of the compressor increases. In other words, the crank portion is at all times affected by the centrifugal force generated by the orbiting scroll member.

In consequence, it can be seen that by providing a passage at a position on the crank portion which is advanced in the direction of rotation with respect to the line of action of the centrifugal force load generated by the orbiting movement of the orbiting scroll member and by feeding a lubricating oil via this passage, the oil will reach a region on the surface of the crank portion on which the centrifugal force load is applied, by the rotation of the crank portion. The supplied oil generates an oil film pressure and an oil film having a sufficient thickness is thereby provided, whereby seizure of the bearing of the orbital scroll member and the crank portion can be prevented. It is preferable to locate the passage at a position which is advanced for an extent of 45 degrees in viewpoint of the relationship between the coefficient of friction and the thickness of the formed oil film.

According to the present invention, it is possible to produce in the bearing an oil film reactor corresponding to the load by the centrifugal force generated by the orbiting scroll member of a scroll fluid apparatus operated at variable speeds, thereby avoiding wear and seizure of the bearing.

DESCRIPTION OF THE PREFERRED EMBODIMENT

An embodiment of the present invention will be described with reference to the accompanying drawings.

Figure 1:
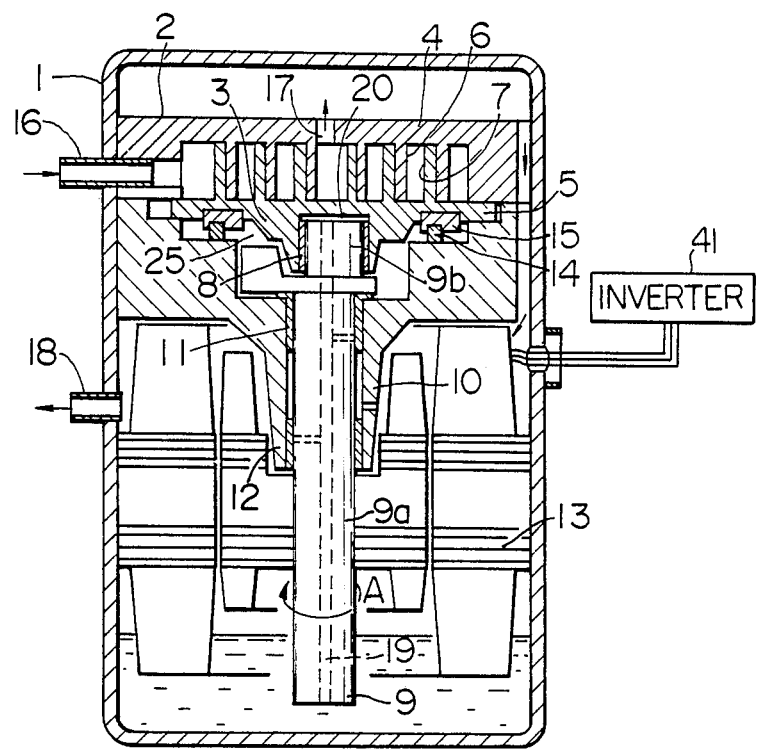
FIG. 1 is a vertical cross-sectional view of a scroll fluid apparatus.
Figure 2:
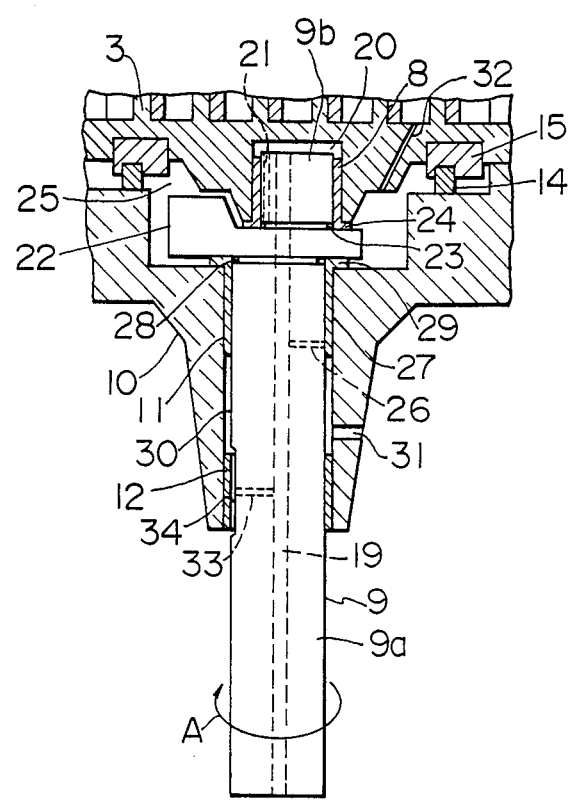
FIG. 2 is a vertical cross-sectional view, on an enlarged scale, of the portion of the crankshaft having one embodiment of an oil feeding device in accordance with the present invention.
Figure 3:
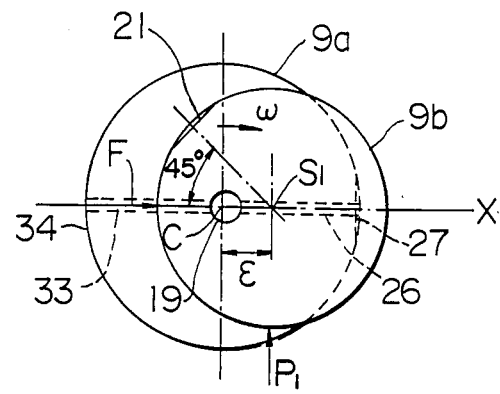
FIG. 3 is an enlarged plan view of the crank portion showing the relationship between the oil flow passages and the direction in which a load is applied.

Referring to FIGS. 1 to 3, a scroll fluid apparatus functioning, for example, as a compressor controlled by an inverter 41 includes a chamber 1, a fixed scroll member generally designated by the reference numeral 2 and an orbiting scroll member generally designated by the reference numeral 3. The fixed scroll member 2 and the orbiting scroll member 3 have disc-shaped end plates 4 and 5 and wraps of vortical form located in upstanding position on the respective end plates 4 and 5, and are maintained in pressing engagement with each other with the wraps 6 and 7 facing inwardly. The orbiting scroll member 3 has mounted on an underside therein a plain bearing 8. This is in engagement with a crank portion 9b of a crankshaft 9 which is off center with respect to a shaft portion 9a of the crankshaft 9. The shaft portion 9a of the crankshaft 9 is journaled by an upper plain bearing 11 and a lower plain bearing 12 mounted on a frame 10. The crankshaft 9 is driven for rotation by an electric motor 13. As the crankshaft 9 rotates, the orbiting scroll member 3 moves in orbiting movement through Oldham's ring 14 and an Oldham's key 15, but is prevented from apparently rotating on its own axis. The gas sucked through a suction pipe 16 is compressed by the orbiting movement of the orbiting scroll member in the sealed spaces defined between the orbiting scroll member 3 and the fixed scroll member 2, and the compressed gas is discharged through an outlet 17 into the chamber 1 from which it is released through a discharge pipe 18. The fluid compressed in the sealed spaces between the two scroll members 2 and 3 applies a load on the shaft portion 9a through the orbiting scroll member 3, the plain bearing 8, and the crank portion 9b of the crankshaft 9. The load applied on the shaft portion is borne by the plain bearings 11 and 12. Rotation of the crankshaft 9 generates a centrifugal force (F) obtained by the following equation on the crank portion 9b.

$$F = m \cdot \gamma \cdot \Omega^2$$

wherein m is the mass of the orbiting scroll member, $\gamma$ is the radius of the orbiting movement (the amount by which the crank portion is off centered), and $\omega$ is an angular velocity ($2\pi N$) in which N represents the rotational speed.

The thus-obtained centrifugal force F acts on the crank portion 9b through the plain bearing 8 in the direction in which the crank portion 9b is off centered.

The crankshaft 9 is formed therein with an oil feeding passageway 19, through which the oil stored on the bottom of the chamber 1 is drawn by the difference between the pressure in the oil reservoir and that in a back pressure chamber 25 defined by the frame 10 and the orbiting scroll member 3. Oil feeding to the bearings 8, 11 and 12 will be described in detail by referring to FIGS. 2 and 3. Oil is introduced into an oil chamber 20 defined by the upper end of the crank portion 9b, the plain bearing 8 and the orbiting scroll member 3, and is then passed through a recessed oil flow passage 21 axially formed on the outer peripheral surface of the crank portion 9b of the crankshaft 9 to lubricate the plain bearing 8 of the orbiting scroll member and the crank portion 9b.

The oil that has lubricated the plain bearing 8 is discharged into an intermediate chamber 25 defined by the frame 10 and the orbiting scroll member 3 after flowing through an annular groove 23 formed in the connection between the crank portion 9b and a balance weight 22 to lubricate a thrust bearing 24 formed in the lower portion of the plain bearing 8 as a unit therewith.

Feed of oil to the upper plain bearing 11 journaling the shaft portion 9a of the crankshaft 9 is effected by feeding the oil to an oil feeding aperture 26 communicating with the oil feeding passageway 19 and a recessed oil flow passage 27 formed axially on the outer pheripheral surface of the shaft portion 9a and communicating with the oil feeding aperture 26. The oil that has lubricated the plain bearing 11 flows through an annular groove 28 formed in the connection between the shaft portion 9a and the balance weight 22 to a thrust bearing 29 formed in the upper portion of the bearing 11 as a unit therewith, to lubricate the thrust bearing 29 before being discharged into the intermediate chamber 25. Part of the oil that has lubricated the upper plain bearing 11 is discharged into an oil discharging chamber 30 defined by the shaft portion 9a, the frame 10, the plain bearing 11 and the plain bearing 12 through the lower end of the plain bearing 11, to be discharged into the chamber 1 through an oil discharging aperture 31 formed in the frame 10.

The oil discharged into the intermediate chamber 25 is supplied through small openings 32 formed in the orbiting scroll member 3 to portions of the two scroll members 2 and 3 in engagement with one another. Thus, an intermediate pressure which is between the discharge pressure and the suction pressure prevails in the intermediate chamber 25. This enables oil to be fed to the upper plain bearing 11 and the plain bearing 8 of the orbiting scroll member by the differential pressure between the discharge pressure and the intermediate pressure.

Feeding of oil to the lower plain bearing 12 journaling the shaft portion 9a of the chankshaft 9 is effected by feeding the oil drawn by suction through the oil feeding passageway 19 to an oil feeding aperture 33 communicating therewith and a recessed oil flow passage 34 formed axially on the outer peripheral surface of the shaft portion 9a and communicating with the oil feeding aperture 33. The oil that has lubricated the lower plain bearing 12 is discharged into the chamber 1 from the upper end of the plain bearing 12 through the oil discharging chamber 30 and the oil discharging aperture 31 and at the same time discharged into the chamber 1 through the lower end of the plain bearing 12.

Among the axially extending oil flow passages 21, 27 and 34 and the oil feeding apertures 26 and 33, the oil flow passage 21 is disposed at a position which is advanced for an extent of 45 degrees in the direction of rotation of the crankshaft 9 with respect to a line X connectng the center C of the shaft portion 9a of the crankshaft 9 and the center S of the crank portion 9b. The oil flow passages 27 and 34 and the oil feeding apertures 26 and 33 are disposed on the line X. It can also be said that the oil flow passage 21 is located at a position which is advanced for an extent of 135 degrees in the direction of rotation of the crankshaft 9 with respect to a line of action of a fluid pressure P1, that is, at a position which is advanced for an extent of 45 degrees in the direction of rotation of the crankshaft 9 with respect to a line of action of the centrifugal force F exerting on the orbiting scroll member, the oil flow passage 27 is located at a position which is advanced for an extent of 270 degrees toward the direction of rotation of the crankshaft 9 with respect to a line of action of fluid pressure P1, and that the oil flow passage 34 is located at a position which is spaced apart for an extent of 180 degrees with respect to the oil flow passage 27. The positional arrangement of these oil flow passages 21, 27 and 34 can effectively cause a bearing oil film reaction to be generated.

The oil feeding device arranged in the manner described above suitable for use in the scroll fluid apparatus controlled at variable speeds by an inverter will be operated as follows.

Figure 4:
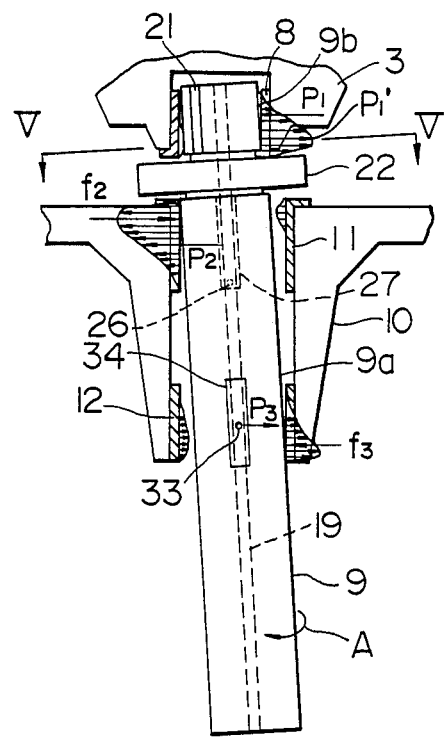
FIG. 4 is a view of the crankshaft portion which illustrates the relationship between the direction in which loads are applied and the bearing oil film pressure distribution.

The electric motor 13 controlled by the inverter 41 is actuated to rotate the crankshaft 9 in the direction of an arrow A in FIG. 2. This makes the orbiting scroll member 3 move in orbiting movement with respect to the fixed scroll member 2, so as to compress gas drawn by suction through the suction pipe 16 into the suction chamber of the compressor and discharge the compressed gas via the discharging port 17. During this compression stroke, pressure P1 of the fluid in sealed spaces defined by the two scroll members 2 and 3 acts on the crank portion 9b through the orbiting scroll member 3 and the plain bearing 8, as shown in FIGS. 3 and 4. On the other hand, the orbiting scroll member 3 moves in orbiting movement by an orbiting radius ε with respect to the fixed scroll member 2. This generates the centrifugal force F which is also applied on the crank portion 9b through the plain bearing 8. In the meantime, the balance weight 22 which copes with the centrifugal force generated by the orbiting scroll member 3 and the crank portion 9b is mounted with respect to the crankshaft 9 between the shaft portion 9a and the crank portion 9b at a position which is spaced apart through 180 degrees from the crank portion, so as to provide static balance of the crankshaft 9. Thus, the crankshaft 9 tilts between the upper plain bearing 11 and the lower plain bearing 12. As a result, a load $P_2$ acts on the plain bearing 11 and a load $P_3$ acts on the plain bearing 12. In other words, the crankshaft is designed, as a rotational shaft, such that the fluid pressure $P_1$ in sealed spaces defined by the two scroll members 2 and 3 acts in the same direction as a bearing reaction $f_3$ of the plain bearing 12 and in the opposite direction from a bearing reaction $f_2$ of the plain bearing 11. Thus, it is seen, as described in the specification of U.S. Pat. No. 4462772, that due to the tilting of the crankshaft 9 oil is fed to the plain bearings 11 and 12 most suitably at positions which are advanced for an extent of 90 degrees in the direction of rotation of the crankshaft 9 with respect to the lines of actions of loads.

In the meantime, rotation of the electric motor 13 generates the centrifugal force F. This force which acts on the plain bearing 8 of the orbiting scroll member 3 must be borne by the bearing 8.

Figure 5:
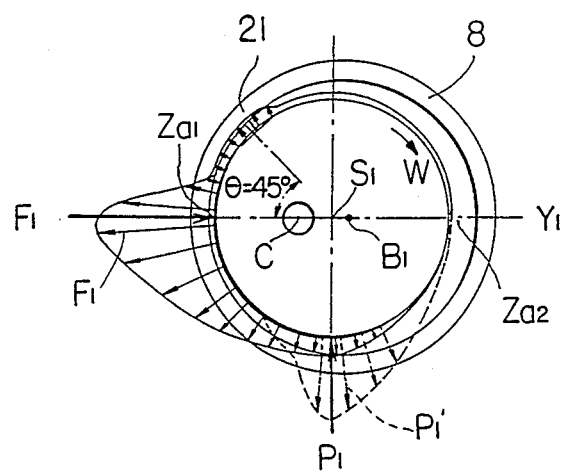
FIG. 5 is a section as viewed in the direction of the arrows V—V in FIG. 4, illustrating the direction in which a load generated by the centrifugal force is applied to the bearing of an orbiting scroll member and the bearing oil film pressure distribution.

The oil film pressure distribution formed between the plain bearing 8 and the crank poriton 9b will be described in some detail by referring to FIG. 5.

As the crankshaft rotates, the center $S_1$ of the crank portion 9b is displaced from the center $B_1$ of the plain bearing 8 by the centrifugal force exerting on the crank portion 9b through an amount determined by the rotational speed of the crankshaft (the bearing gap is shown exaggeratedly in the figure).

A minimum gap position $Z_{a1}$ is formed on a side of the line $Y_1$ connecting the centers $S_1$ and $B_1$ on which the centrifugal force F acts, and a maximum gap $Z_{a2}$ is formed on the opposite side. The oil introduced onto the surface of the bearing from the oil flow passage 21 located at a position which is advanced for an extent of 45 degrees in the direction of rotation of the shaft with respect to the line of action of the centrifugal force F is drawn to the bearing gap between the crank portion 9b and the plain bearing 8 by the rotation of the crank portion 9b as well as the oil supply pressure, and forcibly fed into the region of bearing gap which is narrowing with respect to the direction of rotation of the crank portion. That is, what is generally referred to as a wedging action occurs. By virtue of the wedging action, the oil film pressure varies from the feed oil pressure at the oil flow passage 21 and is maximized at the minimum gap position $Z_{a1}$, to generate an oil film pressure $F_1$, which counteracts the centrifugal force F. Subsequently, the oil film pressure decreases, and is brought to the minimum value at the maximum gap position $Z_{a2}$. Thereafter, the oil film pressure is maintained at a certain value, and is brought to the feed oil pressure at the oil flow passage 21. The oil film pressure is thus generated continuously and adequately which is sufficient to counteract the load F constititing the centrifugal force of the orbiting scroll member.

Figure 6:
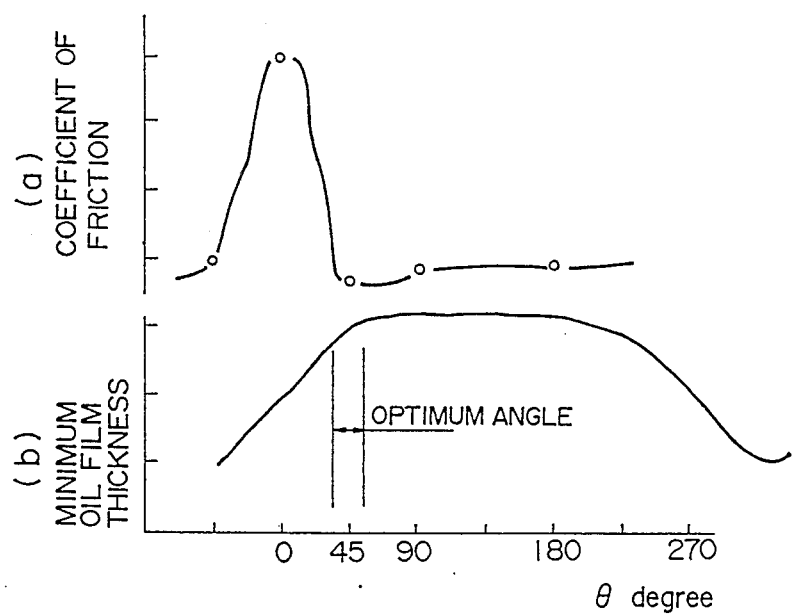
FIGS. 6 (a) and (b) are graphs of coefficient of friction and minimum oil film thickness, showing the relationship between the position of an oil flow passage and the coefficient of friction and the minimum oil film thickness.

However, when the crankshaft 9 is rotated at lower speeds under the control of the inventor, the centrifugal force F is also lower, so that only the load $P_1$ due to fluid pressure is generated. An oil film pressure $P_1^1$ indicated by the dashed lines in FIG. 5 is generated in opposition to the load $P_1$ to support the load. The angle between the load $P_1$ and the oil flow passage at this time is about 135°. This valve of 135° is within the range of 200° within which the oil film is generated, as shown in FIG. 6 as hereinafter described. Thus, the oil film thickness is secured.

As described hereinabove, the oil film pressure can be produced continuously and optimally on the sliding surface of the bearing 8, which is sufficiently high to bear the load P generated by the centrifugal force of the orbiting scroll member.

FIGS. 6 (a) and (b) are graphs of the coefficient of friction of the bearing and the minimum oil film thickness, respectively, which are obtained by the experiments and calculation based thereon in which the position (angle) of the oil flow passage is axially changed with respect to the plain bearing in engagement with the crank portion 9b with the line of action of a load being fixed at angle 0. As the angle of the oil feeding passage 21 is axially changed gradually in the direction of $\theta$, the coefficient of friction shown in (a) which is maximized at angle 0 decreases thereafter, and is minimized at about 45 degrees. Thereafter it rises slightly. The minimum oil film thickness shown in (b) rises in the vicinity of 0 degree until it reaches the maximum value at about 45 degrees. Thereafter, the maximum value is maintained until 200 degrees is reached. Thus, it can be seen in the figures that the coefficient of friction is minimized and the thickest oil film is ensured when the oil flow passage is located at a position of about 45 degrees.

What is claimed is:

1. An oil feeding device for a scroll fluid apparatus, comprising: a fixed scroll member; an orbiting scroll member employed together with said fixed scroll member; a frame; a crankshaft journaled by a bearing of the frame to rotate about an axis; a crank portion of the crankshaft in engagement with a plain bearing of said orbiting scroll member; a variable speed driving motor connected to said crankshaft; and an oil feeding passageway provided in said crankshaft and said crank portion, so as to feed oil to said plain bearing of said orbiting scroll member through a space provided on the end of said crank portion, wherein an oil flow passage is recessed parallel to the axis on the surface of said crank portion at a position which is advanced about 45 degrees toward the direction of rotation of said crank portion with respect to a line of action of a load which is applied on said crank portion of said crankshaft in the radial direction of the crankshaft by a centrifugal force generated by the orbiting movement of said orbiting scroll member.

2. An oil feeding device for a scroll fluid apparatus according to claim 1, wherein said scroll fluid apparatus is housed in a sealed case having an oil reservoir on the bottom thereof, and the opening of said oil feeding passageway which is located at the lower end of said crankshaft is soaked into oil contained in said oil reservoir.

3. An oil feeding device for a scroll fluid apparatus according to claim 2, wherein the interior of said sealed case is maintained under high pressure.

4. An oil feeding device for a scroll fluid apparatus according to claim 1, wherein said variable speed driving motor is a motor driven by an inverter.

* * * * *